United States Patent [19]

Christl et al.

[11] Patent Number: 4,622,474
[45] Date of Patent: Nov. 11, 1986

[54] ALTERNATING-CURRENT FILTER CIRCUIT ARRANGEMENT

[75] Inventors: Norbert Christl, Turgi, Switzerland; Kadry Sadek, Lauchringen, Fed. Rep. of Germany

[73] Assignee: BBC Brown, Boveri & Company, Limited, Baden, Switzerland

[21] Appl. No.: 658,991

[22] Filed: Oct. 10, 1984

[30] Foreign Application Priority Data

Oct. 25, 1983 [DE] Fed. Rep. of Germany ....... 3338629

[51] Int. Cl.$^4$ .......................... H02J 1/02; H02M 1/12
[52] U.S. Cl. .................................. 307/105; 307/106; 307/107; 363/44; 363/45; 323/209
[58] Field of Search ............................... 307/105–110; 363/44–48; 333/172, 181; 323/209, 211

[56] References Cited

U.S. PATENT DOCUMENTS

| | | | |
|---|---|---|---|
| 2,895,080 | 7/1959 | Branker | 307/106 |
| 3,038,134 | 6/1962 | Forssell | 333/181 |
| 4,053,820 | 10/1977 | Peterson et al. | 363/44 |
| 4,195,334 | 3/1980 | Perry et al. | 363/44 |
| 4,224,660 | 9/1980 | Mohan | 363/48 |
| 4,228,492 | 10/1980 | Häusler et al. | 363/48 |
| 4,462,071 | 7/1984 | Blok | 363/44 |

FOREIGN PATENT DOCUMENTS 329677 5/1976 Austria .
2353060 4/1975 Fed. Rep. of Germany .
306785 12/1968 Sweden ................................. 363/47

Primary Examiner—William M. Shoop, Jr.
Assistant Examiner—Shik Luen Paul Ip
Attorney, Agent, or Firm—Burns, Doane, Swecker & Mathis

[57] ABSTRACT

In this three-phase filter circuit system for static converter systems and particularly high-voltage direct-current short ties, at least two high-pass filters are provided which are connected in parallel. Each high-pass filter consists of a choke connected in parallel with a resistance and, in series with both, a capacitor and can be individually connected to the three-phase busbar via a switch. The filter circuits are used not only for reducing harmonics but also as compensating devices, which can be switched in steps, for the reactive power requirement of the static converters so that in the lower partial load range of the system one of the filter circuits is disconnected for reasons of reactive power balance. In order to improve the filtering effect in this lower partial load range, a bus-coupler switch connecting in each case the common junctions of capacitor, resistance and choke of the high-pass filters is closed. When the switch is closed, this widens the band width of the filter circuit which is in operation and increases the resonance frequency, and individual distortions, the total distortion and telephone interference factors on the busbar are reduced.

7 Claims, 2 Drawing Figures

4,622,474

ALTERNATING-CURRENT FILTER CIRCUIT ARRANGEMENT

BACKGROUND OF INVENTION

The invention relates to an alternating-current filter circuit arrangement for static converter systems and a method for filtering harmonics in power-supply networks.

A previously known alternating-current filter circuit arrangement is disclosed in Austrian Pat. No. 329,677. There, one high-pulse filter tuned to lower-order harmonics and one high-pulse filter tuned to higher-order harmonics each are connected between each phase conductor of a three-phase power system in order to attenuate harmonic currents originating from a static converter circuit having a three-phase static-converter bridge. No provision is made for switching high-pulse filters on or off in dependence on reactive-power demand or on changes in the harmonics content.

Static converter systems generate a plurality of current harmonics which can give rise to undesirable distortions of the alternating or three-phase voltage and to telephone interference. In order to prevent this, tuned and/or wide-band filters are usually connected to the three-phase power rail.

A second peculiarity of a static converter is its requirement for fundamental-frequency reactive power. This is dependent on the effective power transmitted and on the terminal voltage ratio of the static-converter reactifiers. As a rule, the fundamental-frequency reactive power is made available wholly or partially by suitable compensating devices. It is possible to use several three-phase filter circuits tuned to different frequencies for this purpose and, if necessary, additional capacitor banks which are connected in parallel with the static converter. These compensating devices are switched in steps in order to match the total compensating power to the reactive-power requirement of the static converter.

As a result of this dual function of the three-phase filter circuits, the problem arises that, for example, when operating a tight high-voltage direct-current (HVDC)-transmission coupling with partial load, on the one hand the amplitudes of some harmonics increase and, on the other hand, it becomes necessary to switch off tuned filter circuits for reasons of the reactive-power balance. Especially in the lower partial-load range of an HVDC-transmission coupling (below 30% of nominal load), the problem of conducting the operation with partially disconnected filters and increased firing angle arises. As a rule, the increase in firing angle in this load range causes an increase in the current harmonics of the order n=23, 25, 35 and 37 fed into the supply network. These order numbers apply to a twelve-pulse HVDC-transmission static converter circuit.

Acting in conjunction with the above-mentioned loss in filter action if the partial-load range, system perturbations and telephone interferences can occur in this operating mode which decisively exceed the usual limits of permissible individual distortions, the total distortion and telephone interference factors.

OBJECT AND SUMMARY OF THE INVENTION

An object of the invention is to improve the filtering of harmonics in a power-supply network by simple means and to specify an alternating-current filter circuit system, especially for static-converter systems, which is also used for providing fundamental-frequency reactive power and which shows good filtering action also in the lower partial-load range of the power to be transmitted when filters are partially switched off for reasons of the reactive-power balance.

The advantages which can be achieved by means of the invention consist especially in the fact that an improvement in the filtering action for the higher harmonics is achieved due to the choke and resistance of a disconnected filter being connected, by the action of a coupling switch which is closed during partial-load operation, in parallel with the operational alternating-current filter circuit. In particular, the resonant frequency and the band width of the filter circuit are increased. Thus the distortions caused by the higher harmonics can be adequately reduced during partial-load operation. In addition, the reactive effect on communications equipment is considerably reduced.

A further essential advantage of the invention is based on the fact that when the coupling switch is retrofitted into already existing filter circuit arrangements, the original filter-circuit characteristic is retained when the coupling switch is open.

DETAILED DESCRIPTION OF THE PREFERRED EMBODIMENT

Figure 1:
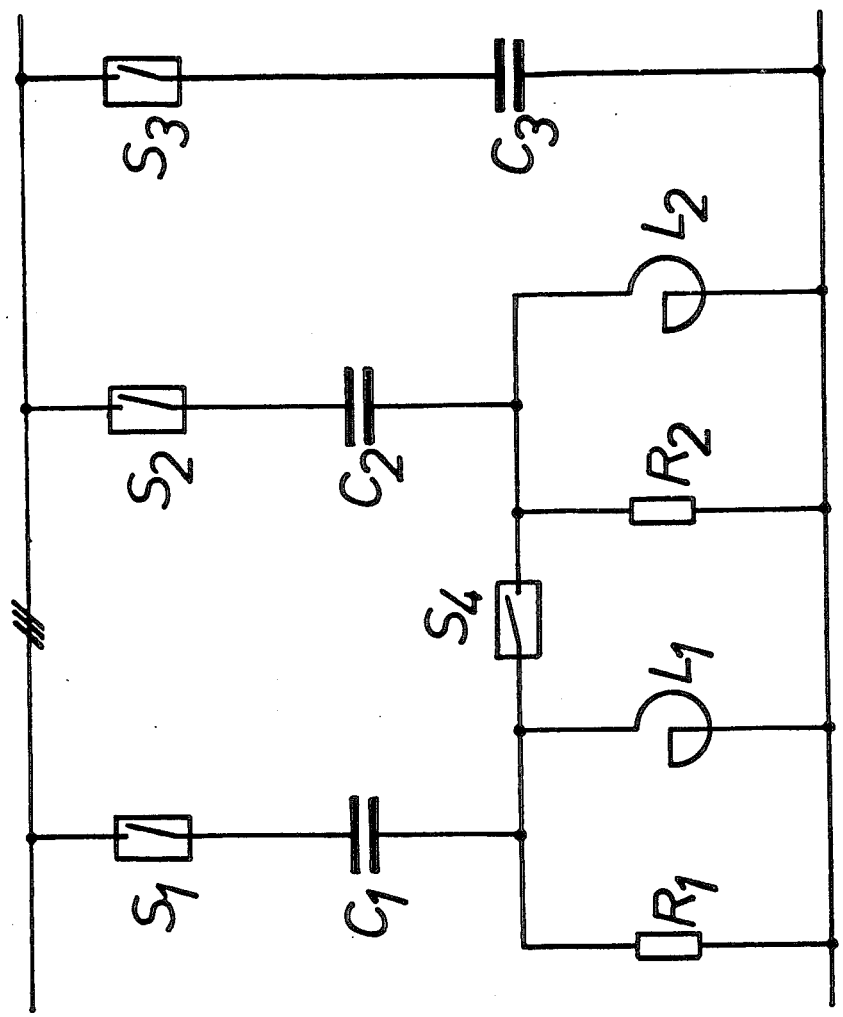
FIG. 1 shows the basic single-line circuit diagram of a three-phase filter circuit arrangement.

In FIG. 1, the basic single-line circuit diagram of a three-phase filter circuit arrangement for a twelve-pulse static converter of a tight HVDC-transmission coupling is shown which is composed of a first high-pass filter for the eleventh harmonic, a second high-pass filter for the thirteenth harmonic and an additional capacitor bank. Each of these reactive-power units is designed as a three-phase unit for one-third of the reactive power required by the HVDC-transmission static converter at rated power.

In detail, the second high-pass filter for the thirteenth harmonic consists of a filter-circuit capacitor C1, a series-connected filter-circuit choke L1 and a damping resistor R1 which is located in parallel with the choke L1. The high-pass filter C1/L1/R1 is connected to the bus bar via a switch S1 which is connected to the capacitor C1.

The first high-pass filter, arranged in parallel with the second high-pass filter C1/L1/R1, for the eleventh harmonic consists of a filter-circuit capacitor C2, a series-connected filter-circuit choke L2 and a damping resistor R2 which is connected in parallel with the choke L2. The high-pass filter C2/L2/R2 is connected to the bus bar via a switch S2 which is connected to the capacitor C2.

The additional capacitor bank, which is located in parallel with the high-pass filters, is designated by C3 and can be switched into circuit via a switch S3.

Between the common junction points of C1/L1/R1 and C2/L2/R2, a coupling switch S4 (also of three-phase design) is arranged.

The three-phase filter circuit arrangement described must fulfil a dual function. On the one hand, provision must be made for keeping the distortion of the network voltage and the telephone interferences as low as possible by tuning the filter-circuit resonant frequencies to the harmonics generated by the static converter. In particular, the eleventh and the thirteenth harmonic occur in this case as characteristic harmonics.

On the other hand, the three-phase filter circuits must wholly or partially compensate the inductive reactive-power absorption by the HVDC-transmission static converter. For this purpose, the compensating reactive power is matched to the reactive-power demand of the static converter in steps of 33.3% of the compensating reactive power during nominal operation by closing or opening the switches S1, S2 and S3, all switches S1, S2 and S3 being closed with full reactive-power demand (nominal operation), the switches S1 and S2 being closed and the switch S3 being opened with a reactive-power demand of 66.6% of the demand during nominal operation and the switch S1 being closed and the switches S2, S3 being open with a reactive-power demand of 33.3% of the demand during nominal operation.

From these two requirements, the problem arises that when the HVDC station is operated with small transmission power (for example at 30% of nominal power), the higher harmonics occur to a greater extent and can no longer be adequately filtered because the three-phase filter circuits are partially switched off for reasons of reactive-power balance. This is made more difficult, especially by the fact that the HVDC-transmission static converter is operated in the lowest partial-load range, but the fact that if an increased firing angle is preselected, the harmonics of the order n=23, 25, 35 and 37 contribute significantly to telephone interference and to system perturbations in the higher-level supply system.

Therefore, when the tight HVDC-transmission coupling is operated in the lowest partial-load range with closed switch S1 and open switches S2 and S3, the switch S4 is closed.

Closing of the switch S4, with simultaneously open switch S2 and disconnected capacitor bank C3, causes the choke coil L2 and the damping resistor R2 of the high-pass filter C2/L2/R2, which is already disconnected with partial load, to be connected in parallel with the filter choke coil L1 of the still operational high-pass filter C1/L1/R1. As a result of this parallel connection, the effective filter-circuit inductance and the effective damping resistance of the operational filter C1/L1/R1 is reduced. In consequence, the resonant frequency of the filter is increased (detuning of the original resonant frequency) and the quality factor is decreased. This simultaneously results in an increase of the bandwidth of the high-pass filter.

Figure 2:
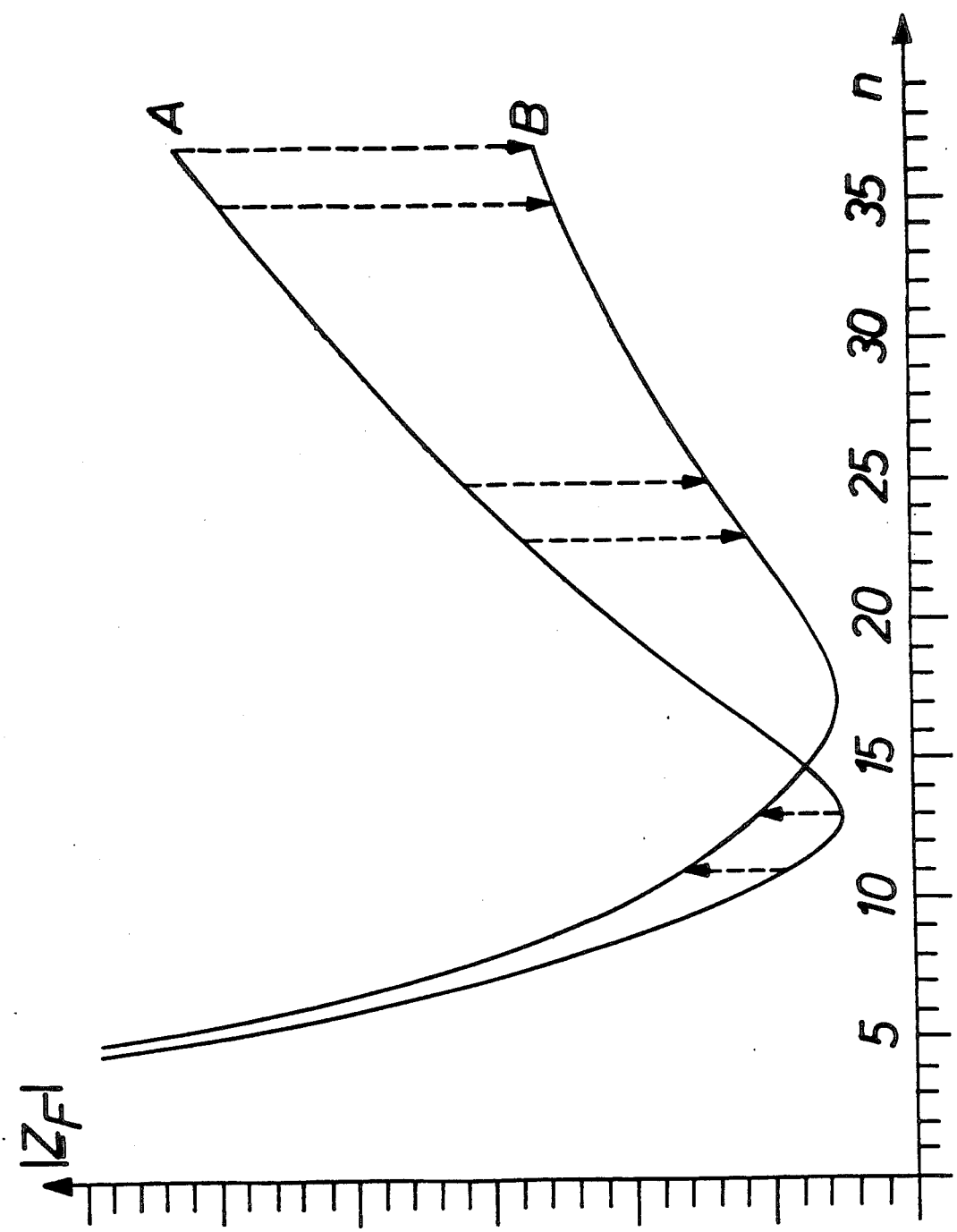
FIG. 2 shows the impedance characteristic of the three-phase filter circuit arrangement with partial load and partially disconnected filters.

In connection with this, FIG. 2 shows the frequency-dependent impedance characteristics of the filter-circuit arrangement (|ZF|=absolute value of the complex filter impedance; n=order number of the harmonic). Curve A here applies to a closed switch S1 with simultaneously open switches S2, S3, S4 whilst curve B is valid for closed switches S1, S4 with simultaneously open switches S2, S3.

As can be seen from FIG. 2, the resonant frequency shifts from the thirteenth harmonic to about the seventeenth harmonic. The filter impedance |ZF| significantly decreases for the harmonic with the order number $n > 15$ while it slightly increases for the harmonic with the order number $n < 15$.

As a result of the measure of connecting the choke coil L2 and the damping resistor R2 into circuit, the individual distortions of the higher harmonic, the total distortion of the system voltage and the telephone interference factors can thus be significantly reduced when operating a tight HVDC-transmission coupling from about 30% of the nominal power down to minimum power with increased firing angle. The coupling switch S4 required for this purpose does not represent a significantly increased expenditure with respect to the costs for a filter-circuit capacitor, choke coils, resistors and circuit breakers of the filter circuits. Since this additional switch must be designed in most cases not for the system voltage of the supply system but for a series voltage within the range of customary medium-high voltage levels (approximately 30 to 72.5 kv), the installation of this switch does not have any great space requirements. An additional advantage resulting from the low space requirement can be seen in the fact that this switch can also be installed subsequently into already existing filter-circuit arrangements and thus provides an improved filtering action with low load without changing the original filter characteristic when the coupling switch S4 is open.

Since the maximum amplitudes of the harmonics of the order n=11 and n=13 occur in tight HVDC-transmission couplings approximately within the range of 60% ... 70% of nominal power and the filtering action of the highpass filters C1/L1/R1 and C2/L2/R2 continues to be effective when the switch S4 is open, the harmonics can thus still be adequately filtered in this load range.

A further advantage is based on the fact that capacitors of the same constructional size and thus the same capacity are provided in the outputs of the tuned filters C1/L1/R1 and C2/L2/R2, respectively. When the switch S4 is closed, the arrangement shown in FIG. 1 has optionally the same impedance characteristic when the switch S1 is open and the switch S2 is closed as when the switch S1 is closed and the switch S2 is open. Due to the redundancy of the filter capacitors consisting of many individual capacitor cans, this fact increases the operational reliability of the filter-circuit arrangement and provides a uniformly divided utilisation time for the filter capacitors with partial load. In addition, spare parts storekeeping is advantageously simplified.

We claim:

1. An alternating-current three-phase filter circuit arrangement for static converter systems comprising
   (a) at least two parallel-connected high-pass filters, each filter being tuned to a different harmonic of the network frequency and including
   (b) a filter choke connected in parallel with a damping resistor and
   (c) a filter-circuit capacitor connected in series with a parallel choke and resistor connection
   (d) and wherein a coupling switch is provided between the filter-circuit capacitor, damping resistor and filter choke of each of the high-pass filters.

2. An alternating-current filter circuit arrangement according to claim 1, wherein the high-pass filters, which are mutually effectively connected via the coupling switch, are tuned to different harmonics of the network frequency.

3. An alternating-current filter circuit arrangement according to claim 1 or 2, wherein the capacitors of the high-pass filters are of the same capacity.

4. An alternating-current filter circuit system according to claim 1, wherein the filter-circuit capacitor of at least one high-pass filter is effectively connected via a switch to a bus bar which is connected to a static converter system.

5. An alternating-current filter circuit system according to claim 1, wherein the filter-circuit capacitor of each high pass filter is connected through a switch to a bus bar.

6. A method for filtering harmonics in a threephase network having at least one HVDC static-converting circuit comprising the steps of:

(a) providing a filter network having at least two parallel-connected high-pass filters each of which includes a filter choke connected in parallel with a damping resistor and a filter capacitor connected in series with a common junction point of the filter choke and damping resistor;

(b) providing a coupling switch between the junction points of two of the filter choke and resistor connections of respective high-pass filters;

(c) providing switches between each said high-pass filter and a bus bar of a static converter system;

(d) opening one of the switches between the bus bar and one of the high-pass filters and closing said coupling switch in response to a decreased reactive-power demand, thereby to connect the filter choke and damping resistor of the high pass filter whose switch is open in parallel with the filter choke and damping resistor of the high pass filter whose switch is closed so that the resonant frequency of the filter network is shifted towards higher frequencies.

7. The method of claim 6, wherein the bandwidth of said filter network is increased by disconnecting at least one high-pass filter.

* * * * *